Dec. 29, 1959   E. WILDHABER   2,918,831
BEVEL-GEAR DIFFERENTIAL
Filed July 15, 1957   3 Sheets-Sheet 1
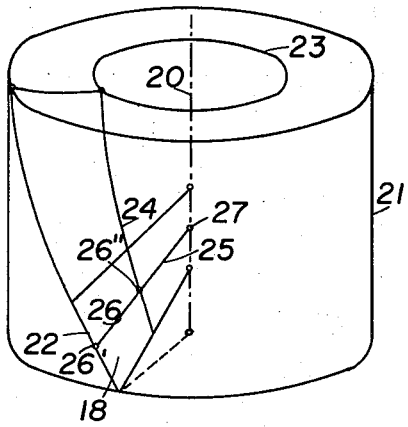
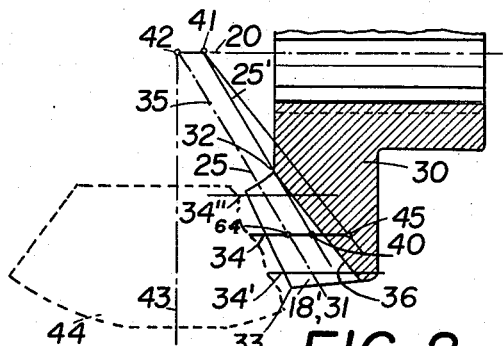
INVENTOR:
Ernest Wildhaber Dec. 29, 1959     E. WILDHABER     2,918,831
BEVEL-GEAR DIFFERENTIAL
Filed July 15, 1957     3 Sheets-Sheet 2

INVENTOR:
Ernest Wildhaber

Dec. 29, 1959  E. WILDHABER  2,918,831
BEVEL-GEAR DIFFERENTIAL
Filed July 15, 1957  3 Sheets-Sheet 3

INVENTOR:
Ernst Wildhaber

United States Patent Office 2,918,831
Patented Dec. 29, 1959

2,918,831

BEVEL-GEAR DIFFERENTIAL

Ernest Wildhaber, Brighton, N.Y.

Application July 15, 1957, Serial No. 671,767

10 Claims. (Cl. 74—711)

The present invention relates to bevel-gear differentials such as may be used in automobiles, trucks and other automotive vehicles for applying power to two parts rotatable relatively to each other, as for instance the two wheels of a rear axle. It is a continuation-in-part of my application "Toothed Member," filed November 26, 1956, Serial No. 624,343.

One object of the present invention is to devise a bevel-gear differential having side gears and planetary pinions whose tooth shape is specifically adapted to differentials. A further object is to devise a bevel-gear differential having friction disks coaxial with its side gears, wherein said side gears are somewhat displaced axially under load, as pressure is transmitted through the disks, and wherein a tooth shape is provided that permits such axial displacement without disturbing the gear mesh, and without displacing the tooth bearing area. A related aim is to provide a differential whose side gears contain helical tooth surfaces.

A further object is to devise bevel gears and mating pinions, for differentials, that have less limitations as to tooth length than those now in use, and that can be provided with longer and stronger teeth, even when tooth bottoms of constant width are used. A similar object is to devise bevel gears and mating pinions, for differentials, whose tooth depth can be reduced, or stubbed, without impairing the transmission of uniform motion, so that the breaking strength of the teeth can be increased.

Other objects will appear in the course of the specification and in the recital of the appended claims. These objects may be attained singly or in any combination.

Some embodiments of the invention will now be described with reference to the accompanying drawings, in which:

Fig. 1 is a diagrammatic perspective view illustrating the nature of the tooth surfaces preferably provided on the side gears constructed according to the present invention.

Fig. 2 is a fragmentary axial section of a side gear constructed according to the present invention, showing also the outline of a mating pinion.

Fig. 3 is a view taken along the bottom of a tooth space, looking in Fig. 2 from the outer end of the teeth towards the gear axis.

Fig. 4 is an axial section, partly a side view, of a pair of bevel gears, showing a modified form of gears for differentials.

Fig. 5 is a fragmentary section taken along line 63—64 of Fig. 4, looking towards the side gear.

Fig. 6 is a fragmentary section taken along line 72 of Fig. 4, parallel to the tooth bottom of the pinion.

Fig. 7 is a fragmentary view along the tooth bottom of a pinion, such as might be used with a gear of the general character shown in Fig. 4. The view is taken from the outer end towards the projected pinion axis.

Fig. 8 is a fragmentary axial section of a differential embodying the invention.

Fig. 10 is a fragmentary axial section of a side gear shown in engagement with a form-cutting tool finishing one tooth side, as the tool reciprocates and is simultaneously tilted.

Fig. 11 is a fragmentary axial section of a side gear shown in engagement with a rotary tool or milling cutter, for producing the helical tooth surfaces with describing and enveloping cuts.

Fig. 12 is an enlarged view showing the outer end of this milling cutter in an axial plane.

Figures 13 and 14 are diagrammatic side views illustrating two ways of broaching the helical tooth sides of the side gears.

Fig. 15 is a diagram illustrating a way of generating a pinion conjugate to side gears having helical tooth sides.

Fig. 16 is a section taken along lines 131—134 of Fig. 15, looking towards the left.

Figure 9:
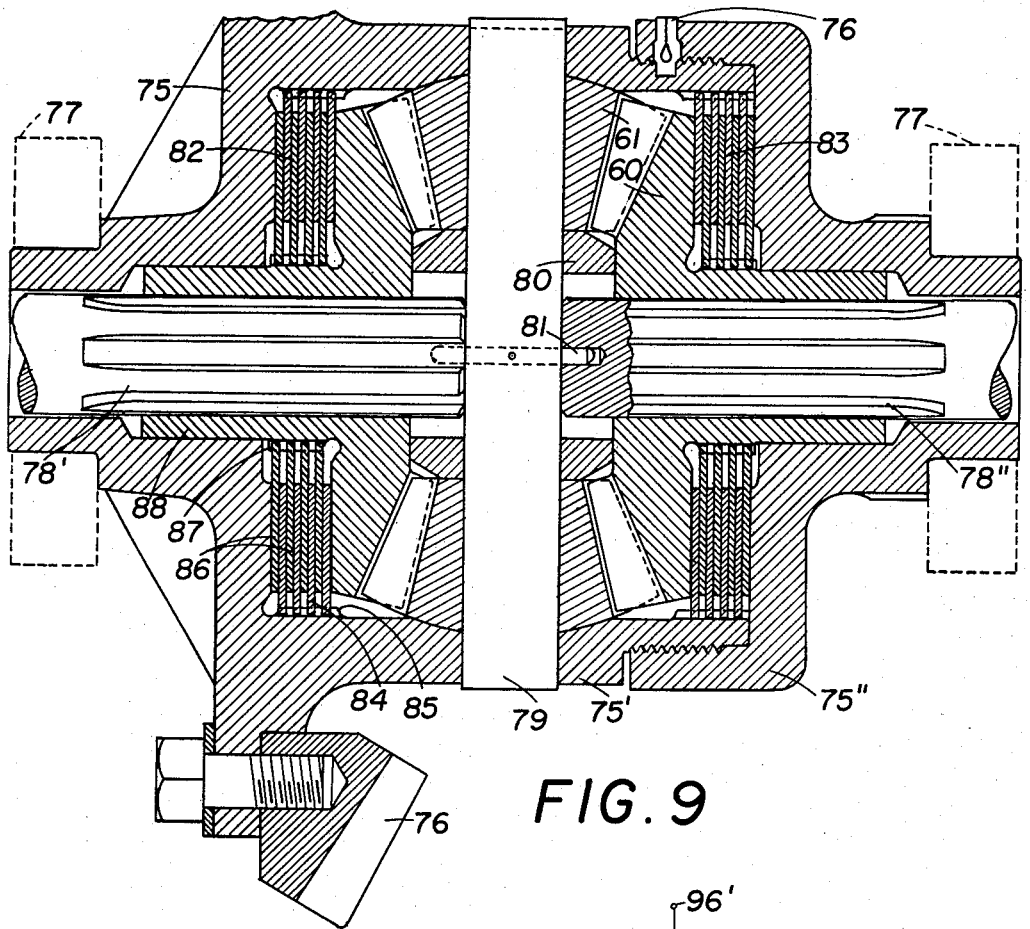
Fig. 9 is an axial section of a modified form of differential, using the gears shown in Fig. 4.

The perspective view, Fig. 1, illustrates the kind of surface preferably provided on the tooth sides of the side gears. This surface 18 is a helical surface of constant lead, briefly a helical surface. It contains an infinite number of helices of the same lead, that all extend about an axis 20, which coincides with the gear axis. The various helices lie on coaxial cylindrical surfaces. An outer cylindrical surface 21 contains helix 22. An inner cylindrical surface 23 contains helix 24. Surface 18 contains straight-line elements 25, one such element being shown passing through mean point 26 of the surface. This element intersects axis 20 at 27 and is inclined at an acute angle to this axis. It intersects the helices 22 and 24 at points 26' and 26" respectively.

Helical surface 18 can be described by turning element 25 about axis 20 and by simultaneously moving said element along axis 20 at a constant proportion to the turning motion. In this describing motion the points 26', 26" describe the helices 22 and 24 respectively; and point 27 describes the axis 20.

The surfaces used on the gear teeth do not necessarily have to contain exact straight-line elements 25. Instead of being straight in axial sections they can also be curved. But the general direction of the teeth is preferably towards the gear axis (20) at an acute angle to said axis.

Also the tooth surfaces of the side gears may be helical surfaces only approximately, but sufficiently to behave like helical surfaces.

One merit of a helical tooth surface is that it can be displaced in itself, by turning it about and moving it along its axis. Accordingly when a helically toothed side gear is displaced moderately in the direction of its axis relatively to its pinions, the gear may also turn on its axis to remain in contact with the pinions, and the gear tooth surface then occupies exactly the same position as before the axial displacement. The tooth bearing remains undisturbed.

After axial displacement, conventional tooth surfaces however cannot be turned to exactly coincide with the initial position. Hence the tooth bearing will be displaced. Without tooth ease-off or crowning the tooth bearing will immediately shift to the boundaries of the tooth surfaces, that is to the ends and edges of the teeth. And ease-off cannot stop but only moderate such tooth-bearing displacement on conventional teeth.

However when the side gears contain the helical tooth surfaces according to the invention, the tooth bearing will stay put on axial displacement of the gears, no matter how little crowning, if any, is provided.

Fig. 2 shows a side gear 30 containing such helical tooth surface 18'. Its teeth 31 are straight and directed towards the gear axis 20, at an acute angle to the gear axis. The teeth have a tapering depth which increases from the inner end 32 to the outer end 33 of the teeth.

Cylindrical sections coaxial with the gear axis 20 intersect the tooth sides in helices. Thus cylindrical sections containing straight-line elements 34', 34, 34" show on the same side of the teeth helices of the same lead whose inclinations or helix angles increase with increasing radius of the cylindrical surface. They increase from sections 34" to 34'. The helix angle $h$ is the inclination to the direction of the gear axis. Its trigonometric tangent is proportional to the radius $r$ of the cylindrical surface, and depends on the lead $L$ as shown:

$$\tan h = \frac{2\pi r}{L}; \pi = 3.14159$$

In the embodiment illustrated in Fig. 2 the straight-line element 25 of the helicoid is an element of the pitch cone 35 of the gear 30. If element 25 is considered to lie in the drawing plane of Fig. 2, plane sections taken along lines 34", 34, 34' show tooth profiles which are practically straight and are inclined at the above varying angle $h$ to the drawing plane.

Preferably the tooth spaces have a constant or approximately constant width all along their length at the tooth bottoms 36, or at a small and constant distance from the tooth bottom. This does not require an excessive tooth taper, as teeth of constant profile inclination do.

Fig. 3 is a view along the tooth bottom 36. The side profiles 37 at the outer end of the teeth, and the side profiles 38 at their inner end differ from straight lines only very slightly, not enough to show up in Fig. 3. The inclination of the side profiles changes along the teeth with respect to the plane of symmetry 20' that contains axis 20. Profiles 37 are more inclined than profiles 38.

To achieve a constant space width along the length of the teeth at the tooth bottoms, or a small constant distance above them, on both members of the gear pair, the direction of the tooth bottoms should be determined in accordance with the nature of the tooth surfaces. Let it be assumed that the plane of symmetry (20') of a tooth space coincides with the drawing plane of Fig. 2.

A constant width may be desired at the level of point 40 at the lower end of the working profile, the gear profile below point 40 being relieved. Let us consider the tangent planes to the tooth sides at opposite points 40. Each such tangent plane contains the straight-line element (25) of the helicoid. If a curved describing line is used, it contains the tangent to such line. The straight-line elements 25' of opposite points 40, or the said tangents at points 40, intersect at 41 on axis 20, at a distance 41—42 from the apex 42, the intersection of the axes 20, 43 of gear 30 and pinion 44. The helix tangents at opposite points 40 intersect at 45 in the plane of symmetry. Thus the opposite tangent planes intersect in a straight line 41—45.

To assure a constant width at the level of points 40, the tooth bottom 36 should run in a direction parallel to intersection line 41—45. A constant or nearly constant width of tooth bottom is desired for production reasons, and for reasons of tooth strength.

If the gear teeth had a constant profile inclination all along their length, the opposite tangent planes would pass through apex 42, and the tooth bottoms of constant width would have to extend in a direction parallel to the connecting line of the points 42 and 45. The tooth depth would be much more tapered; and the tooth length would thereby be much more restricted. With the invention longer and stronger teeth are feasible.

Pinion 44 is formed conjugate to gear 30.

A differential embodying such side gears 30 and planetary pinions 44 is shown at a reduced scale in Fig. 8. It is of the partially locking type. Its one-piece planet carrier 47 has two bevel pinions 44 rotatably mounted thereon by means of a pin 48 secured to said carrier. The carrier contains seats 50 for antifriction bearings. Rigidly secured to the planet carrier by a toothed face coupling 51 is a ring gear 52. The coupling 51 is maintained in rigid engagement by a nut 53 that threads onto said carrier.

The side gears 30 are splined to two axle shafts 54', 54" respectively and are rotatably mounted in the planet carrier. Instead of bearing directly against the sides of the carrier, the plane rear surfaces 55 of the side gears 30 transmit their axial thrust to the opposite sides of carrier 47 through interengaging friction disks 56, 57. These are secured to the hubs of the side gears and to the carrier respectively, to turn therewith. The disks 57 have projections that engage the sides of a pair of diametrically opposite square holes 58 provided in the planet carrier 47. Only one of these holes is visible in Fig. 8. Both sets of disks are free to move axially.

In operation the friction disks 56, 57 are under axial load increasing with increasing torque transmitted through the differential. They provide a frictional resistance to the relative turning motion of the two side gears and their axle shafts. When one wheel slips, this enables the wheel which has a good grip on the road to exert more pull than the slipping one.

The side gears move back very slightly under load, away from the pinions. Also they move further back with increasing wear of the friction disks. This axial displacement is without consequence when the gears 30 contain helical tooth surfaces as described.

Other kinds of locking differentials of bevel-gear type are known, having different friction surfaces. These also oppose relative turning motion of the two axle shafts (54', 54") increasingly with increasing torque transmitted through the differential. Here also the side gears move somewhat axially under load and after wear, more than in conventional differentials with less friction. Here also gears with helical tooth surfaces cure the difficulties.

A further improved form of bevel gears for differentials will now be described. The gear 60 and pinion 61 shown in Fig. 4 differ from the gear pair of Fig. 2 in that the gear teeth 62 are differently directed. Instead of being directed towards the apex 42, or intersection point of the axes 20, 43 of the gear pair, they are directed towards a point 63 offset from apex 42. The teeth extend along a plane 63—64 passing through mean point 64. This point also lies on the instantaneous axis 65 and on the conical pitch surface 65', of which axis 65 is an element.

Plane 63—64 is the drawing plane of Fig. 5, looking towards the gear body. Instantaneous axis 65 intersects the drawing plane at 64 and extends below the drawing plane at the outer end 33' of the teeth.

A line of tooth contact is known to be the normal projection of the instantaneous axis (65) to a considered tooth surface. The lines of contact of the different turning positions make up the surface of action. The latter contains the instantaneous axis and follows the tooth-surface normals at least approximately. Because of the inclination of the instantaneous axis the surface of action at one side of the teeth intersects the drawing plane in a line 66, and on the opposite side in a line 66'. The lines 66, 66' are oppositely inclined to the projected instantaneous axis 65 and to the longitudinal direction of the teeth. They constitute the paths of contact in the drawing plane.

Tooth side 67 of the pinion is shown in a position where it intersects its path of contact 66 at the outer end point 68. Contact at the inner end point 68' is effected only after side 67 has moved to the right so that it passes through point 68'. It is seen that the points of the drawing plane, the mean points of the outer and inner tooth profiles, get into contact position successively, so that the overall duration of contact is increased by the tilted position of the instantaneous axis. Such teeth have the merit of spiral teeth, without however showing the larger and opposite end thrusts on the two sides of the teeth. Uniform motion is transmitted not merely through profile action alone, but also through the overlap of the tooth length. Such teeth are capable of transmitting uniform motion even when the profile action is not long enough to carry the teeth through a whole pitch. And it is possible to reduce the tooth depth to make the teeth stronger.

Preferably the teeth 62 are provided with helical tooth sides, as described, so that the tooth profiles in cylindrical sections coaxial with the gear are portions of helices. The tooth profiles are practically straight in plane sections laid through the helix tangents parallel to the gear axis. The teeth have profile inclinations increasing with increasing distance from the gear axis in a definite way.

The teeth 62 extend in axial planes at an acute angle 70 to the gear axis 20. This angle 70 is larger than the pitch angle 71 of the gear.

Another merit of this disposition will now be described with Fig. 6 and Fig. 7. Fig. 6 is a section taken through the tooth space of a pinion along line 72. It contains mean point 64 and is parallel to the tooth bottom 73 of the pinion. 74 is the path of contact of side 67' in the sectional plane. 74' represents the path of contact of the opposite side. Side 67' is also shown in a turning position 67" where it passes through the mean point 64 of the instantaneous axis.

If the profile inclination is constant all along line 67" and equal to the profile inclination at mean point 64, it will no longer be constant at the path of contact 74. Outer point 75 of line 67" is then turned about the pinion axis to a position 75' of path 74. As it is so turned the tooth normal at 75 increases its inclination to the drawing plane, so that at point 75' this inclination is larger than at mean point 64. At the inner end of path 74 the inclination is smaller. The said inclination also represents the profile inclination based on the drawing plane of Fig. 6, which is viewed in a direction towards the gear body.

It is seen then that through suitable selection of the angle 70 the pressure angle of the gear pair and the profile inclination of the gear can be made to increase with increasing distance from the gear axis at the rate required by the helical tooth surfaces. In other words, although lines 67' and 67" of the pinion have a constant profile inclination, the pressure angle of the gear pair increases with increasing distance from the gear axis as required.

The pinion tooth surfaces no longer need to be warped. The view of Fig. 7 is along the tooth bottom 73 and along line 67', which is projected into a point. As the profile inclination along line 67' is now constant, the pinion tooth surfaces 67 may be made surfaces of constant profile. The profiles have a constant inclination to the plane of symmetry of a tooth space, all along the length of the tooth space. Such surfaces can be produced with conventional form-cutting operations, as for instance by broaching or milling.

The increase of angle 70 over the pitch angle 71 is also useful without the presence of helical tooth surfaces, as it increases the duration of contact. Furthermore it permits the use of longer teeth when combined with a tapering tooth depth and applied to a tapered gear, especially when teeth are used whose pressure angle increases with increasing distance from the gear axis.

A constant width of the tooth space at the bottom 36' or at any desired constant distance from the bottom can be attained by determining the direction of the tooth bottom in the manner described with Fig. 2, when helical tooth sides are provided on the gear. The direction of the tooth bottom 73 of the pinion can be similarly determined from the requirement that the mating gear tooth or its extension should have a constant thickness at a given distance from the tooth bottom of the pinion.

In Fig. 4, point 45' corresponds to point 45 of Fig. 2. It is the intersection of the said opposite profile tangents. Point 41' corresponds to point 41 of Fig. 2. Distance 63—41' is equal to the axial distance from mean point 64 to the level where the space width shall be constant lengthwise of the tooth space. It corresponds to distance 64—40 (Fig. 2), which is equal to distance 42—41.

Points 45" and 41" (Fig. 4) determine the direction of the tooth bottom 73 of the pinion, to correspond to a constant gear tooth thickness at a given small distance from bottom 73. Distance 63—41" is equal to the distance from mean point 64 to the level of said constant thickness, measured in the direction of the gear axis 20. Point 45", like point 45', is the intersection of opposite profile tangents applied at the given level. The pinion tooth bottom 73 is parallel to the connecting line of the points 41" and 45".

While straight tooth bottoms have been shown, these may also be somewhat curved, especially concavely curved. The direction of the tooth bottom and of the root surface shall then be defined by the straight line that connects opposite ends of the tooth bottom. This chord may be called the root line. In Fig. 4 the extended root line 36' intersects the gear axis 20 at a point which practically coincides with point 63. This intersection point, the root apex, is offset from the apex 42 at which the axes 20, 43 intersect. The root surface is directed towards a root apex lying between point 42 and the gear body.

The pinion 61 contains a tapered and preferably conical face surface 150, whose apex 151 lies on the pinion axis 43 beyond apex 42, that is further away from the pinion body than apex 42.

While I have shown straight teeth on the gear 60 and pinion 61, teeth that are curved lengthwise may also be used, if desired.

Fig. 9 shows a bevel-gear differential making use of the gear pair 60, 61 of Fig. 4. Two planetary pinions 61 are rotatably mounted in a planet carrier 75 rigid with a drive gear 76, by means of a pin 79. The carrier 75 comprises a main portion 75' and an end portion 75" rigidly secured to said main portion. It threads onto the main portion and is secured against turning, as by a partly split pin 76 that expands under pressure. A bearing 77 is secured to each of the two portions 75', 75", to rotatably mount said carrier. Rotatably mounted in the carrier on opposite sides of pinions 61 are two side gears 60, having preferably helical tooth surfaces. They are connected with axle shafts 78', 78" respectively.

A spacer 80 may be used to keep the two gears 60 apart. Pin 79 is secured axially in any suitable manner, as for instance by a smaller pin 81 reaching through its center and held in place by central bores provided at the ends of shafts 78', 78".

Two sets 82, 83 of interengaging friction disks are provided on opposite sides of the pinions 61. The disks 84 of each set are connected by splines 85 to the planet carrier 75 to turn therewith, and to be axially movable thereon. They are splined to the main portion 75' of the carrier, so that the end portion 75" does not transmit any torque to speak of. Disks 86 interengage with the disks 84 and are connected by splines 87 to the hubs 88 of the side gears 60, and thereby to the two shafts 78', 78" respectively. The two sets 82, 83 of disks transmit the axial tooth-pressure component of the side gears 60 to the opposite sides of the carrier 75, and provide a desired amount of internal friction opposing relative turning motion of the two shafts 78', 78".

I have shown friction disks in the illustrated differentials. Differentials with friction disks or their equivalent constitute an application where the helical tooth sides of the side gears are particularly desirable, because of the increased axial displacement of the side gears in use and during the life of the differential. However the invention is not confined to such differentials nor to the use of two pinions therein. It is also useful in bevel-gear differentials without friction surfaces, as it permits to use longer and stronger teeth.

The gears of the present invention may also be used in differentials with hydraulic locking or braking provision, as shown in my application "Differential" filed May 31, 1957, Serial No. 662,662.

The production

Figure 10:
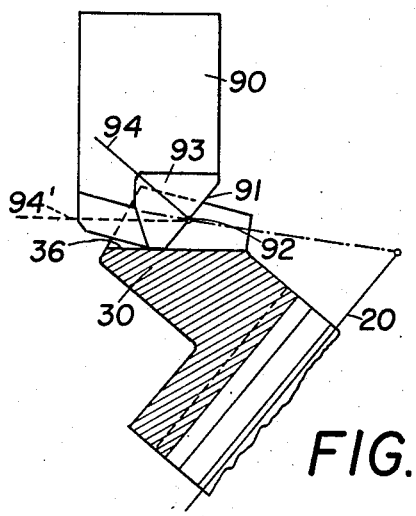
Figures 10 to 16 are diagrammatic views illustrating the production of the side gears and planet pinions used in the bevel-gear differentials of the present invention.

One way of cutting the helical tooth sides of a side gear 30 (or 60) will now be described with Fig. 10.

Tool 90 contains a straight cutting edge 91 for cutting one side of the tooth surfaces. Edge 91 represents the helix tangent at mean point 92. A cutting face 93 with ample side rake provides a keen cutting edge 91. As the tool 90 is reciprocated along the tooth bottom 36, it is simultaneously tilted about an axis 94 perpendicular to the gear axis 20, to assume the varying inclinations of the helix tangent. In this way the tooth surface is finished in a form-cutting operation in the end position of a depth-wise feed. A plurality of tools may be used simultaneously. To cut all the teeth of the work piece, the latter is indexed from time to time.

Helical tooth surfaces of excellent approximation may be produced in this way.

If desired, a tilt axis 94' that extends in the direction of the tool stroke may be used in place of axis 94.

One way of producing the mating pinion is by direct generation. Such generation comprises describing a tooth side of the gear with a cutting tool, while simultaneously effecting a relative feed motion between the tool and pinion blank, as if the gear and pinion would mesh with and roll on each other. The proper conjugate tooth surface is then generated with enveloping cuts on the pinion blank. The pinion may also be produced by rapid form-cutting methods of the general character described in my application Serial No. 573,034, filed March 21, 1956.

Figure 11:
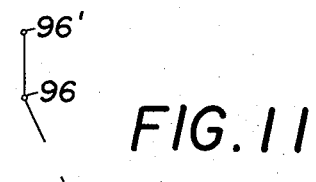

A process of cutting the helical side surfaces of a tooth space with a rotary tool will now be described with Figures 11 and 12. The tool may be embodied as a large milling cutter 95 having an axis 96, shown close to the cutter periphery for convenience. No individual cutting edges are shown, only a fragment of the cutting surface described by the cutting edges as they rotate about the cutter axis.

The cut starts with the cutter axis in a position 96' and the cutter periphery in the dotted position 95' relatively to the work piece 60. As the cutter rotates, helical feeding motion is effected between the cutter and the work piece, about and along the axis 20 of the work piece. The turning motion about axis 20, at least, is preferably performed by the work piece.

A helical tooth side is completed when the full-depth position is reached, where the cutter axis is at 96 and the cutter periphery is at 95 relatively to the work piece. The opposite side of the tooth space may be cut on the way out, as the cutter and work piece separate. The tooth spaces are preferably roughed out before this finishing cut is applied.

The cutter 95 cuts chiefly with its outer end, which is well rounded at the cutting sides. The cutting surface, in which the cutting edges lie, is a surface of revolution that contacts the given helical surface along a line, and can be so determined. During the feed motion this line gradually sweeps the entire tooth surface.

Figures 12, 13, 14:
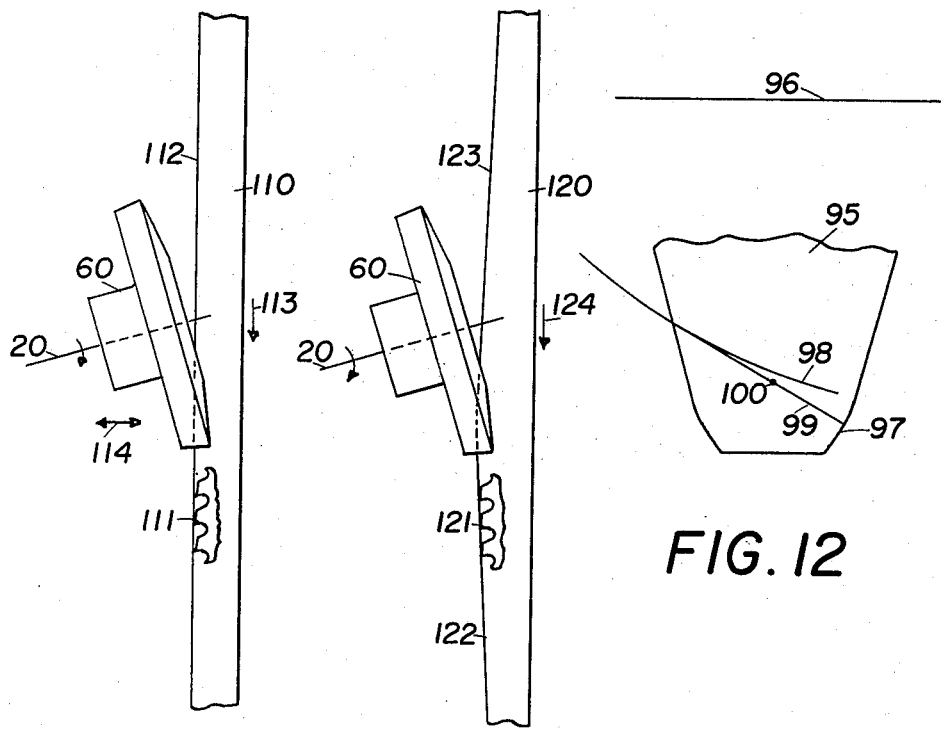

Fig. 12 shows the side profile 97 of the cutter 95 much enlarged, and with the cutter axis 96 shown too close to the profile. Profile 97 is a curve of varying curvature if the helicoid is to have straight-line elements 25. Its curvature radii increase towards the outside. It is similar to an involute with base circle 98. The larger the diameter of the cutter, the smaller are the curvature radii 99 of profile 97. At one diameter the mean curvature center is at 100, midway between the opposite side profiles. If desired, a circle centered at 100 may then be substituted for the exact cutter profile.

Two ways of broaching the teeth of the side gears 60 are shown in Figures 13 and 14 respectively. Broach 110 contains a large number of identical cutting edges 111 that lie on a straight line 112. As the broach moves uniformly in the direction of this line and of arrow 113, the work piece 60 turns continuously and uniformly on its axis 20, see arrow, while being fed towards the broach 110 in proportion to its turning motion. This feed may be either along axis 20 or along arrow 114. One side of a tooth space is finished during the in-feed towards the broach. The opposite side may be finished during the out-feed, away from the broach, while the work piece continues to turn in the same direction and at the same rate.

Preferably a roughing operation precedes this finishing cut.

Broach 120 of Fig. 14 has the lateral feed built in, and requires no lateral feed. Its cutting edges 121 are disposed in a sloped straight line 122 for embodying the in-feed, and in an oppositely sloped line 123 for embodying the out-feed. In the broaching operation the broach moves in the direction of arrow 124, while the work piece 60 turns on its axis 20 in direct proportion to the displacement of the broach.

Figure 15:
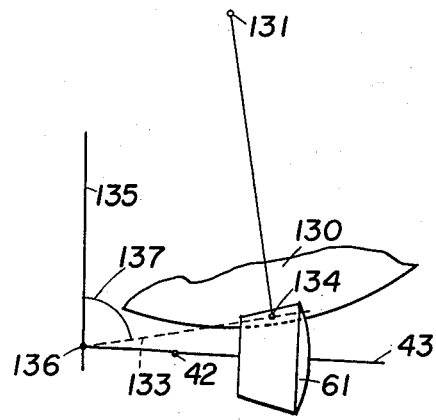
Figure 16:
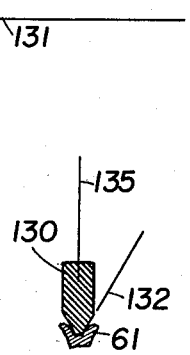

Figures 15 and 16 illustrate a way of generating the pinion 61 with a large milling cutter 130. Cutter 130 has an axis 131 and may have straight-sided cutting profiles 132. Curved profiles may however also be used. The cutting direction is so selected that both sides of a tooth space are in cutting engagement. The plane of symmetry of the cutter coincides with the plane of symmetry of the tooth space in the shown mean position. The cutter diameter is so determined that the cutting surface, in which the cutting edges lie, contacts each of the side surfaces of the pinion tooth space along a line. This line of contact can be determined mathematically, or experimentally. The surface normals at this line of contact intersect the drawing plane of Fig. 15, that is the plane of symmetry, along a line whose tangent 133 at mean point 134 determines the instantaneous feed motion. Tangent 133 is shown in dotted lines.

The generating motion is a turning motion about a cradle axis 135 and a simultaneous turning motion about the work axis 43 at a constant ratio. The ratio is such that tangent 133 is the instantaneous axis of relative motion. The cradle axis 135 should pass through the intersection point 136 of tangent 133 and pinion axis 43.

The angle 137 included between tangent 133 and cradle axis 135 determines the profile curvature of the pinion. The smaller the angle 137, the more the pinion profiles will be curved. Angle 137 can be either computed or determined by trial.

If desired, I may use a pair of cutters for cutting opposite tooth sides.

In the special case already described with Fig. 7 the pinion can be form-cut by broaching or milling.

While the invention has been described with several different embodiments thereof, it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

I claim:

1. In a differential, in combination, a rotary driving member carrying a plurality of bevel pinions rotatably mounted thereon, two side gears coaxial with said driving member and meshing with said pinions, said side gears being connected with a pair of axle shafts respectively, friction means opposing relative turning motion of said axle shafts under load, said side gears having teeth whose opposite working surfaces have profiles that are approximately straight in cylindrical sections coaxial with said side gears when said sections are developed into a plane, said profiles being inclined to the direction of the axis of the respective side gear increasingly with increasing distance from said axis.

2. A pair of gears for differentials, having intersecting axes and teeth of tapering depth increasing with increasing distance from the gear axis, said pair comprising a gear having tooth profile inclinations increasing with increasing distance from the gear axis, and a pinion conjugate to said gear, said gear having its root surface directed towards a root apex offset from the intersection point of the axes of the gear pair and lying on the gear axis between said point and the gear body.

3. A pair of gears for differentials, having intersecting axes and teeth of tapering depth increasing with increasing distance from the gear axis, said pair comprising a gear having tooth profile inclinations increasing with increasing distance from the gear axis, and a pinion conjugate to said gear, said pinion having a conical face surface whose apex lies beyond the gear axis, so as to have a larger distance from the pinion body than the intersection point of the axes of the gear pair.

4. A pair of bevel gears according to claim 3, wherein the teeth are straight and follow planes containing the axis of the respective member of the gear pair.

5. A pair of bevel gears according to claim 3, wherein the pinion has a tapering tooth depth but a constant cross-sectional shape all along the length of a tooth space.

6. A differential according to claim 1, wherein said friction means comprises two sets of interengaging friction disks disposed on opposite sides of said pinions, respectively, the disks of each set being connected with said planet carrier and with a driven member respectively.

7. A differential according to claim 6, wherein the friction disks of both sets that are connected with the planet carrier are connected to portions formed integral with each other.

8. A differential according to claim 7, wherein the planet carrier comprises a main portion to which the drive gear is secured, said main portion having internal splines for rotatably holding friction disks of both of said sets, and an end portion rigidly secured to said main portion, each of said two portions carrying a bearing for rotatably mounting the planet carrier.

9. A differential according to claim 8, wherein the end portion is threaded onto said main portion, and wherein said end portion is secured against turning by a pin that is split for more than half its length.

10. A pair of bevel gears having intersecting axes and longitudinally straight teeth, comprising a gear having teeth whose profile inclinations increase with increasing distance from the gear axis, and a pinion conjugate to said gear, the teeth of said gear being directed longitudinally along lines intersecting the gear axis between the intersection point of said axes and the gear body, and the teeth of said pinion being directed longitudinally along lines intersecting the pinion axis beyond said intersection point.

References Cited in the file of this patent
UNITED STATES PATENTS

| | | |
|---|---|---|
| 1,481,889 | Carhart | Jan. 29, 1924 |
| 1,893,572 | Wildhaber | Jan. 10, 1933 |
| 2,506,756 | Wildhaber | May 9, 1956 |